US012792558B2

(12) United States Patent
Piednoel

(10) Patent No.: US 12,792,558 B2
(45) Date of Patent: Nov. 10, 2026

(54) AUTONOMOUS VEHICLE SYSTEM ON CHIP

(71) Applicant: Mercedes-Benz Group AG, Stuttgart (DE)

(72) Inventor: Francois Piednoel, Sunnyvale, CA (US)

(73) Assignee: Mercedes-Benz Group AG, Stuttgart (DE)

( * ) Notice: Subject to any disclaimer, the term of this patent is extended or adjusted under 35 U.S.C. 154(b) by 347 days.

(21) Appl. No.: 18/195,807

(22) Filed: May 10, 2023

(65) Prior Publication Data

US 2024/0375670 A1 Nov. 14, 2024

(51) Int. Cl.
*G06F 15/78* (2006.01)
*B60R 16/023* (2006.01)

(52) U.S. Cl.
CPC ...... *G06F 15/7807* (2013.01); *B60R 16/0231* (2013.01)

(58) Field of Classification Search
CPC .................................................. G06F 15/7807
USPC ............................................................ 710/1
See application file for complete search history.

(56) References Cited

U.S. PATENT DOCUMENTS 10,992,257 B2 4/2021 Narla
11,388,054 B2 7/2022 Bernat
11,410,266 B2 8/2022 Matam
11,507,527 B2 11/2022 Saleh
11,531,110 B2 * 12/2022 Lu ............................ G06T 7/74
11,565,606 B2 1/2023 Kazuno
11,573,856 B1 2/2023 Ditty
12,229,079 B2 2/2025 Piednoel
2018/0364701 A1 * 12/2018 Liu ..................... G05D 1/0038
2018/0365908 A1 * 12/2018 Liu ....................... G05D 1/227
2019/0220028 A1 * 7/2019 Anderson ............. G06N 5/022
2019/0391855 A1 12/2019 Bernat
2020/0017114 A1 1/2020 Santoni et al.
2020/0018606 A1 * 1/2020 Wolcott ............ G01C 21/3819
2021/0255637 A1 * 8/2021 Kale ..................... G06N 3/049
2022/0084329 A1 * 3/2022 Lakshamanan ... B60W 50/0098
(Continued)

FOREIGN PATENT DOCUMENTS

CN 109976357 A 7/2019
CN 110879546 A 3/2020
(Continued)

OTHER PUBLICATIONS

Francois Piednoel, SNUG Silicon Valley 2023 Keynote, The Standardization Imperative for Chiplets. Mar. 29-30, 2023, Santa Clara, CA. https://www.synopsys.com/community/resources/videos/snug-keynotes.html.
(Continued)

*Primary Examiner* — Titus Wong
(74) *Attorney, Agent, or Firm* — Mahamedi IP Law LLP

(57) ABSTRACT

A system on chip (SoC) can include a central chiplet with a functionally safe shared memory through which other chiplets of the SoC communicate. The SoC can also include a cache memory accessible by the chiplets, a sensor input chiplet to receive sensor data from sensors and store the sensor data in the cache memory, a machine learning accelerator chiplet to calculate inferences using machine learning, and an autonomous drive chiplet to calculate autonomous driving algorithms.

20 Claims, 4 Drawing Sheets

(56) References Cited

U.S. PATENT DOCUMENTS

| | | | | |
|---|---|---|---|---|
| 2022/0114028 | A1 | 4/2022 | Peng et al. | |
| 2022/0126878 | A1* | 4/2022 | Moustafa .............. | B60W 40/09 |
| 2022/0283971 | A1 | 9/2022 | Lee | |
| 2022/0350751 | A1 | 11/2022 | Koker et al. | |
| 2023/0032305 | A1 | 2/2023 | Krishnani | |
| 2023/0035610 | A1 | 2/2023 | Lee | |
| 2023/0036117 | A1 | 2/2023 | Krishnani | |
| 2023/0046642 | A1* | 2/2023 | Hung ..................... | G06N 3/063 |
| 2023/0063601 | A1 | 3/2023 | Upadhyay | |
| 2023/0168921 | A1* | 6/2023 | Kim ........................ | G06F 15/80<br>712/220 |
| 2023/0176577 | A1* | 6/2023 | Ditty .................... | G06V 20/588<br>701/23 |
| 2024/0270263 | A1 | 8/2024 | Neumann | |
| 2024/0411606 | A1 | 12/2024 | Piednoel | |

FOREIGN PATENT DOCUMENTS

| | | | |
|---|---|---|---|
| CN | 112149369 | A | 12/2020 |
| CN | 114780227 | A | 7/2022 |
| CN | 115688093 | A | 2/2023 |
| GB | 2560708 | | 9/2018 |
| KR | 20210015472 | A | 2/2021 |

OTHER PUBLICATIONS

International Search Report with Written Opinion of the International Searching Authority for the Application No. PCT/EP2024/025155 mailed Jul. 22, 2024.

* cited by examiner

AUTONOMOUS VEHICLE SYSTEM ON CHIP

BACKGROUND

Universal Chiplet Interconnect Express (UCIe) provides an open specification for an interconnect and serial bus between chiplets, which enables the production of large system on chip (SoC) packages with intermixed components from different silicon manufacturers. Autonomous vehicle computing systems may operate using chiplet arrangements that follow the UCIe specification. One goal of creating such computing systems is to achieve the robust safety integrity levels of other important electrical and electronic (E/E) automotive components of the vehicle.

SUMMARY

An on-board, vehicle computing system is described herein that includes a system on chip (SoC) with a number of specialized chiplets to take data from sensors in the vehicle and make decisions for autonomous driving in a functionally safe manner.

As used herein, a system on chip (SoC) is an integrated circuit that combines multiple components of a computer or electronic system onto a single chip, providing a compact and efficient solution for a wide range of applications. The main advantage of an SoC is its compactness and reduced complexity, since all the components are integrated onto a single chip. This reduces the need for additional circuit boards and other components, which can save space, reduce power consumption, and reduce overall cost. The components of an SoC are often referred to as chiplets, which are small, self-contained semiconductor components that can be combined with other chiplets to form the SoC. Chiplets are designed to be highly modular and scalable, allowing for the creation of complex systems from smaller, simpler components and are typically designed to perform specific functions or tasks, such as memory, graphics processing, or input/output (I/O) functions. They are usually interconnected with each other and with a main processor or controller using high-speed interfaces. Chiplets offer increased modularity, scalability, and manufacturing efficiency compared to traditional monolithic chip designs, as well as the ability to be tested individually before being combined into the larger system.

In various implementations, the SoC includes a central chiplet with a functionally safe shared memory through which other chiplets of the SoC communicate. The SoC can also include a cache memory accessible by the chiplets, a sensor input chiplet to receive sensor data from sensors and store the sensor data in the cache memory, a machine learning accelerator chiplet to calculate inferences using machine learning, and an autonomous drive chiplet to calculate autonomous driving algorithms.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
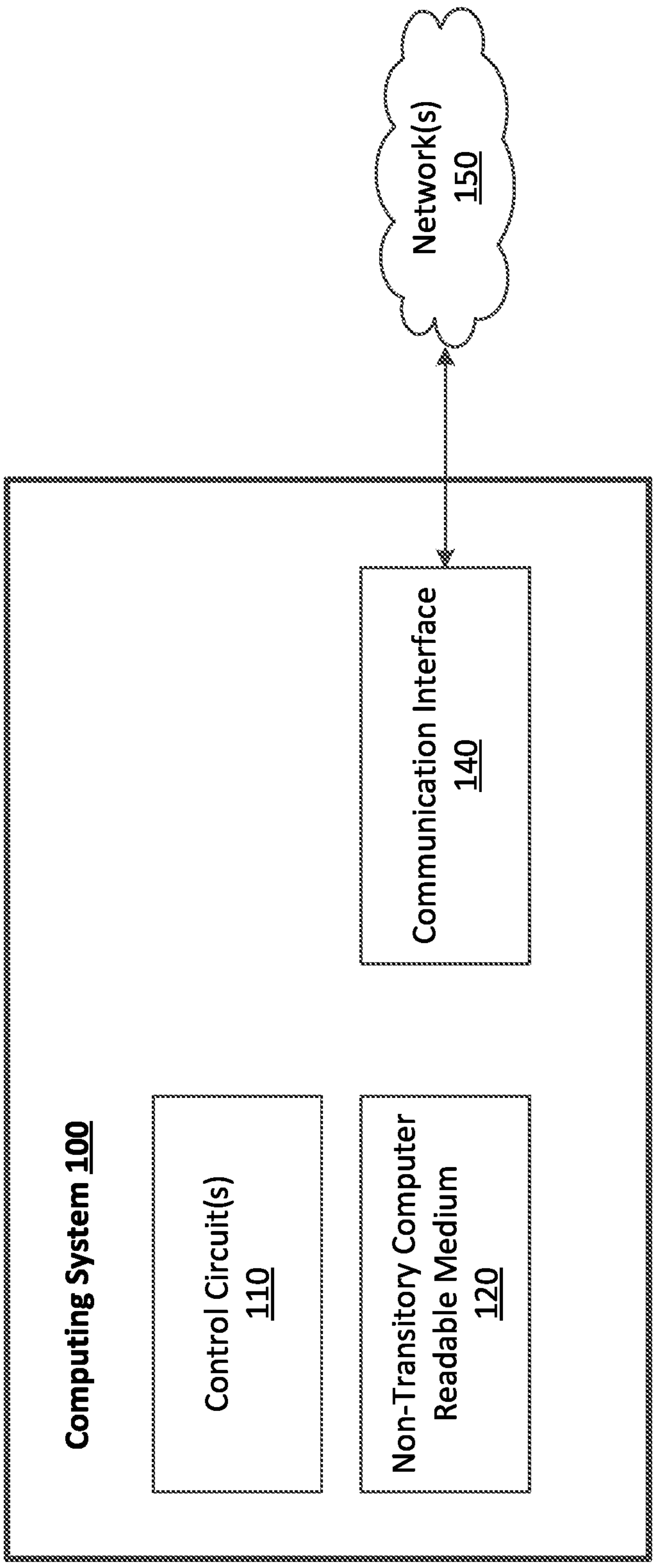
FIG. 1 is a block diagram depicting an example computing system in which embodiments described herein may be implemented, in accordance with examples described herein.

In experimentation and controlled testing environments, system redundancies and automotive safety integrity level (ASIL) ratings for autonomy systems are not typically a priority consideration. As autonomous driving features continue to advance (e.g., beyond Level 3 autonomy), and autonomous vehicles begin operating more commonly on public road networks, the qualification and certification of E/E components related to autonomous operation of the vehicle will be advantageous to ensure operational safety of these vehicles. Furthermore, novel methods for qualifying and certifying hardware, software, and/or hardware/software combinations will also be advantageous in increasing public confidence and assurance that autonomous driving systems are safe beyond current standards. For example, certain safety standards for autonomous driving systems include safety thresholds that correspond to average human abilities and care. Yet, these statistics include vehicle incidences involving impaired or distracted drivers and do not factor in specified time windows in which vehicle operations are inherently riskier (e.g., inclement weather conditions, late night driving, winding mountain roads, etc.).

Automotive safety integrity level (ASIL) is a risk classification scheme defined by ISO 26262 (the functional safety for road vehicles standard), and is typically established for the E/E components of the vehicle by performing a risk analysis of potential hazards, which involves determining respective levels of severity (i.e., the severity of injuries the hazard can be expected to cause; classified between S0 (no injuries) and S3 (life-threatening injuries)), exposure (i.e., the relative expected frequency of the operational conditions in which the injury can occur; classified between E0 (incredibly unlikely) and E4 (high probability of injury under most operating conditions)), and controllability (i.e., the relative likelihood that the driver can act to prevent the injury; classified between C0 (controllable in general) and C3 difficult to control or uncontrollable)) of the vehicle operating scenario. As such, the safety goal(s) for any potential hazard event includes a set of ASIL requirements.

Hazards that are identified as quality management (QM) do not dictate any safety requirements. As an illustration, these QM hazards may be any combination of low probability of exposure to the hazard, low level of severity of potential injuries resulting from the hazard, and a high level of controllability by the driver in avoiding the hazard and/or preventing injuries. Other hazard events are classified as ASIL-A, ASIL-B, ASIL-C, or ASIL-D depending on the various levels of severity, exposure, and controllability corresponding to the potential hazard. ASIL-D events correspond to the highest integrity requirements (ASIL requirements) on the safety system or E/E components of the safety system, and ASIL-A comprises the lowest integrity requirements. As an example, the airbags, anti-lock brakes, and power steering system of a vehicle will typically have an ASIL-D grade, where the risks associated with the failure of these components (e.g., the probable severity of injury and lack of vehicle controllability to prevent those injuries) are relatively high.

As provided herein, the ASIL may refer to both risk and risk-dependent requirements, where the various combinations of severity, exposure, and controllability are quantified to form an expression of risk (e.g., an airbag system of a vehicle may have a relatively low exposure classification, but high values for severity and controllability). As provided above, the quantities for severity, exposure, and controllability for a given hazard are traditionally determined using values for severity (e.g., S0 through S3), exposure (e.g., E0 through E4), and controllability (e.g., C0 through C3) in the ISO 26262 series, where these values are then utilized to classify the ASIL requirements for the components of a particular safety system. As provided herein, certain safety systems can perform variable mitigation measures, which can range from alerts (e.g., visual, auditory, or haptic alerts), minor interventions (e.g., brake assist or steer assist), major interventions and/or avoidance maneuvering (e.g., taking over control of one or more control mechanisms, such as the steering, acceleration, or braking systems), and full autonomous control of the vehicle.

Current fully autonomous driving systems can comprise non-deterministic inference models, in which the system executes one or more perception, object detection, object classification, motion prediction, motion planning, and vehicle control techniques based on, for example, two-dimensional image data, to perform all autonomous driving tasks. It is contemplated that such implementations may be difficult or impossible to certify and provide an ASIL rating for the overall autonomous driving system. To address these shortcomings in current implementations, an autonomous driving system is provided herein that may perform deterministic, reflexive inference operations on specified hardware arrangements that allow for the certification and ASIL grading of various components, software aspects of the system, and/or the entire autonomous driving system itself.

In accordance with examples described herein, the use of a dual SoC arrangement in which each SoC in the pair alternates between primary and backup responsibilities can facilitate in the overall certification and ASIL grade of the autonomous driving system of the vehicle. In this arrangement, the first SoC and second SoC utilize isolated power sources and can be electrically coupled to each other by way of eFuses (e.g., active circuit protection devices with integrated field-effect transistors (FETs) used to limit currents and voltages to safe levels during fault conditions), which can further bolster the ASIL grade of the arrangement. The SoCs may have direct memory access to each other (e.g., via a functional safety component of each SoC), which can facilitate dynamic health monitoring, error checks, and seamless transitions between primary and backup status.

In certain implementations, the computing system can perform one or more functions described herein using a learning-based approach, such as by executing an artificial neural network (e.g., a recurrent neural network, convolutional neural network, etc.) or one or more machine-learning models. Such learning-based approaches can further correspond to the computing system storing or including one or more machine-learned models. In an embodiment, the machine-learned models may include an unsupervised learning model. In an embodiment, the machine-learned models may include neural networks (e.g., deep neural networks) or other types of machine-learned models, including non-linear models and/or linear models. Neural networks may include feed-forward neural networks, recurrent neural networks (e.g., long short-term memory recurrent neural networks), convolutional neural networks or other forms of neural networks. Some example machine-learned models may leverage an attention mechanism such as self-attention. For example, some example machine-learned models may include multi-headed self-attention models (e.g., transformer models).

As provided herein, a "network" or "one or more networks" can comprise any type of network or combination of networks that allows for communication between devices. In an embodiment, the network may include one or more of a local area network, wide area network, the Internet, secure network, cellular network, mesh network, peer-to-peer communication link or some combination thereof and may include any number of wired or wireless links. Communication over the network(s) may be accomplished, for instance, via a network interface using any type of protocol, protection scheme, encoding, format, packaging, etc.

As further provided herein, an "autonomy map" or "autonomous driving map" comprises a ground truth map recorded by a mapping vehicle using various sensors (e.g., LIDAR sensors and/or a suite of cameras or other imaging devices) and labeled to indicate traffic and/or right-of-way rules at any given location. For example, a given autonomy map can be human labeled based on observed traffic signage, traffic signals, and lane markings in the ground truth map. In further examples, reference points or other points of interest may be further labeled on the autonomy map for additional assistance to the autonomous vehicle. Autonomous vehicles or self-driving vehicles may then utilize the labeled autonomy maps to perform localization, pose, change detection, and various other operations required for autonomous driving on public roads. For example, an autonomous vehicle can reference an autonomy map for determining the traffic rules (e.g., speed limit) at the vehicle's current location, and can dynamically compare live sensor data from an on-board sensor suite with a corresponding autonomy map to safely navigate along a current route.

Among other benefits, the examples described herein achieve a technical effect of providing redundancy and functional safety monitoring for SoCs to, for example, increase the safety integrity level of an autonomous vehicle computing system.

One or more examples described herein provide that methods, techniques, and actions performed by a computing device are performed programmatically, or as a computer implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs, or machines.

Some examples described herein can generally require the use of computing devices, including processing and memory resources. For example, one or more examples described herein may be implemented, in whole or in part, on computing devices such as servers and/or personal computers using network equipment (e.g., routers). Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a non-transitory computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of non-transitory computer-readable media include permanent memory storage devices, such as hard drives on personal computers or servers. Other examples of computer storage media include portable storage units, such as flash memory or magnetic memory. Computers, terminals, network-enabled devices are all examples of machines and devices that utilize processors, memory, and instructions stored on computer-readable media. Additionally, examples may be implemented in the form of computer programs.

Example Computing System

FIG. 1 is a block diagram depicting an example computing system 100 in which embodiments described herein may be implemented, in accordance with examples described herein. In an embodiment, the computing system 100 can include one or more control circuits 110 that may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), systems on chip (SoCs), or any other control circuit. In some implementations, the control circuit(s) 110 and/or computing system 100 may be part of, or may form, a vehicle control unit (also referred to as a vehicle controller) that is embedded or otherwise disposed in a vehicle (e.g., a Mercedes-Benz® car, truck, or van). For example, the vehicle controller may be or may include an infotainment system controller (e.g., an infotainment head-unit), a telematics control unit (TCU), an electronic control unit (ECU), a central powertrain controller (CPC), a central exterior & interior controller (CEIC), a zone controller, an autonomous vehicle control system, or any other controller (the term "or" is used herein interchangeably with "and/or").

In an embodiment, the control circuit(s) 110 may be programmed by one or more computer-readable or computer-executable instructions stored on the non-transitory computer-readable medium 120. The non-transitory computer-readable medium 120 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium 120 may form, for example, a computer diskette, a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick. In some cases, the non-transitory computer-readable medium 120 may store computer-executable instructions or computer-readable instructions.

In various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 110 to perform one or more functional tasks. The modules and computer-readable/executable instructions may be described as performing various operations or tasks when the control circuit(s) 110 or other hardware components execute the modules or computer-readable instructions.

In further embodiments, the computing system 100 can include a communication interface 140 that enables communications over one or more networks 150 to transmit and receive data. In various examples, the computing system 100 can communicate, over the one or more networks 150, with fleet vehicles using the communication interface 140 to receive sensor data and implement the intersection classification methods described throughout the present disclosure. In certain embodiments, the communication interface 140 may be used to communicate with one or more other systems. The communication interface 140 may include any circuits, components, software, etc. for communicating via one or more networks 150 (e.g., a local area network, wide area network, the Internet, secure network, cellular network, mesh network, and/or peer-to-peer communication link). In some implementations, the communication interface 140 may include for example, one or more of a communications controller, receiver, transceiver, transmitter, port, conductors, software and/or hardware for communicating data/information.

As an example embodiment, the control circuit(s) 110 of the computing system 100 can include a dual SoC arrangement that facilitates the various methods and techniques described throughout the present disclosure. In various examples, the SoCs can perform a set of tasks in a primary SoC and backup SoC arrangement, where the primary SoC performs the set of tasks, and the backup SoC maintains a standby state and monitors the status and/or state of the primary SoC. In various implementations, the set of tasks can comprise a set of autonomous driving tasks, such as perception, object detection and classification, grid occupancy determination, sensor data fusion and processing, motion prediction (e.g., of dynamic external entities), motion planning, and vehicle control tasks for autonomously operating a vehicle along a travel route. As described herein, multiple dual SoC arrangements may be implemented for performing these tasks, with each SoC pair being configured in the manner described in detail below.

System Description

Figure 2:
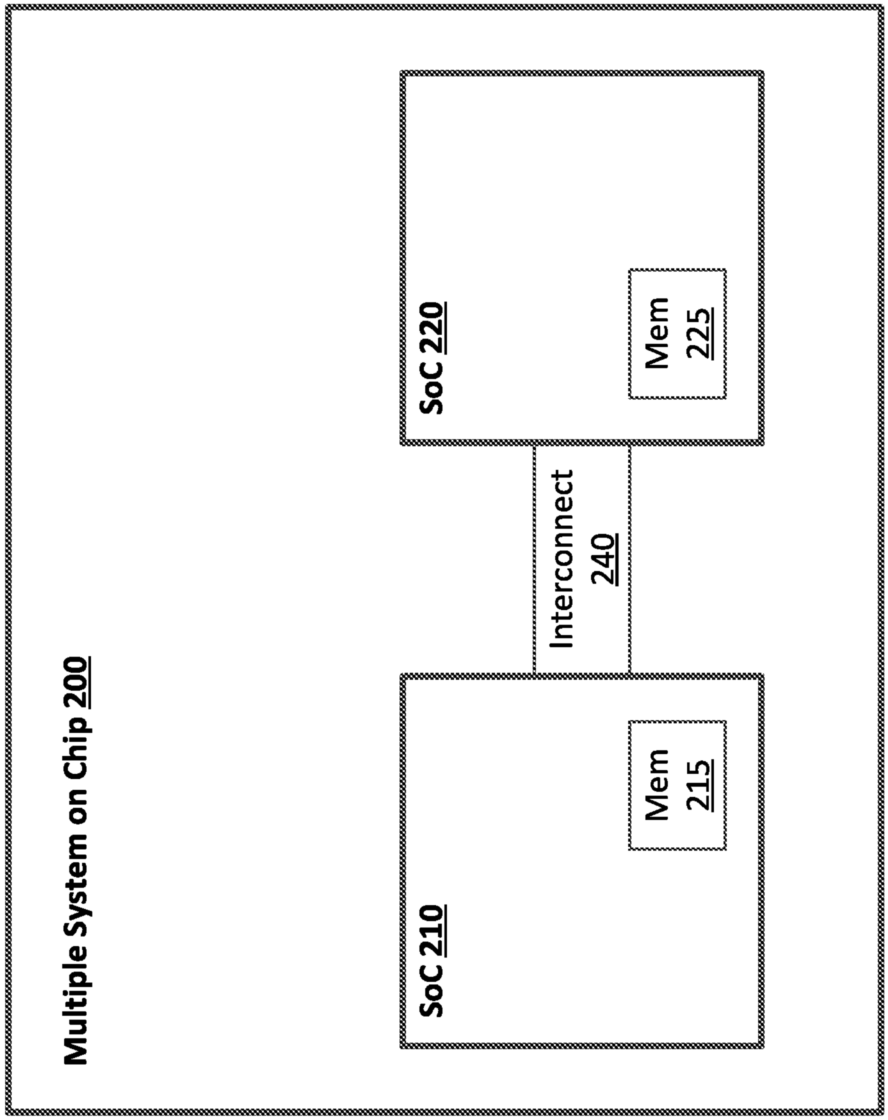
FIG. 2 is a block diagram depicting an example computing system implementing a multiple system-on-chip (SoC), in accordance with examples described herein.

FIG. 2 is a block diagram depicting an example multiple system on chip (MSoC), in accordance with examples described herein. In various examples, the MSoC 200 can include a first SoC 210 having a first memory 215 and a second SoC 220 having a second memory 225 coupled by an interconnect 240 (e.g., an ASIL-D rated chip-to-chip interconnect) that enables each of the first SoC 210 and second SoC 220 to read each other's memories 215, 225. During any given session, the first SoC 210 and the second SoC 220 may alternate roles, between a primary SoC and a backup SoC. As provided herein, the primary SoC can perform various autonomous driving tasks, such as perception, object detection and classification, grid occupancy determination, sensor data fusion and processing, motion prediction (e.g., of dynamic external entities), motion planning, and vehicle control tasks. The backup SoC can maintain a set of computational components (e.g., CPUs, ML accelerators, and/or memory chiplets) in a low power state, and continuously or periodically read the memory of the primary SoC.

For example, if the first SoC 210 is the primary SoC and the second SoC 220 is the backup SoC, then the first SoC 210 performs a set of autonomous driving tasks and publishes state information corresponding to these tasks in the first memory 215. The second SoC 220 reads the published state information in the first memory 215 to continuously check that the first SoC 210 is operating withing nominal thresholds (e.g., temperature thresholds, bandwidth and/or memory thresholds, etc.), and that the first SoC 210 is performing the set of autonomous driving tasks properly. As such, the second SoC 220 performs health monitoring and error management tasks for the first SoC 210, and takes over control of the set of autonomous driving tasks when a triggering condition is met. As provided herein, the triggering condition can correspond to a fault, failure, or other error experienced by the first SoC 210 that may affect the performance of the set of tasks by the first SoC 210.

In various implementations, the second SoC 220 can publish state information corresponding to its computational components being maintained in a standby state (e.g., a low power state in which the second SoC 220 maintains readiness to take over the set of tasks from the first SoC 210). In such examples, the first SoC 210 can monitor the state information of the second SoC 220 by continuously or periodically reading the memory 225 of the second SoC 220 to also perform health check monitoring and error management on the second SoC 220. For example, if the first SoC 210 detects a fault, failure, or other error in the second SoC 220, the first SoC 210 can trigger the second SoC 220 to perform a system reset or reboot.

In certain examples, the first SoC 210 and the second SoC 220 can each include a functional safety (FuSa) component that performs the health monitoring and error management tasks. The FuSa component can be maintained in a powered state for each SoC, whether the SoC operates in a primary or backup manner. As such, the backup SoC may maintain its other components in a low powered state, with its FuSa component being powered up and performing the heath monitoring and error management tasks described herein.

In various aspects, when the first SoC 210 operates as the primary SoC, the state information published in the first memory 215 can correspond to the set of tasks being performed by the first SoC 210. For example, the first SoC 210 can publish any information corresponding to the surrounding environment of the vehicle (e.g., any external entities identified by the first SoC 210, their locations, and predicted trajectories, detected objects, such as traffic signals, signage, lane markings, and crosswalk, and the like). The state information can further include the operating temperatures of the computational components of the first SoC 210, bandwidth usage and available memory of the chiplets of the first SoC 210, and/or any faults or errors, or information indicating faults or errors in these components.

In further aspects, when the second SoC 220 operates as the backup Soc, the state information published in the second memory 225 can correspond to the state of each computational component of the second SoC 220. In particular, these components may operate in a low power state in which the components are ready to take over the set of tasks being performed by the first SoC 210. The state information can include whether the components are operating within nominal temperatures and other nominal ranges (e.g., available bandwidth, power, memory, etc.).

As described throughout the present disclosure, the first SoC 210 and the second SoC 220 can switch between operating as the primary SoC and the backup SoC (e.g., each time the system 200 is rebooted). For example, in a computing session subsequent to a session in which the first SoC 210 operated as the primary SoC and the second SoC 220 operated as the backup SoC, the second SoC 220 can assume the role of the primary SoC and the first SoC 210 can assume the role of the backup SoC. It is contemplated that this process of switching roles between the two SoCs can provide substantially even wear of the hardware components of each Soc, which can prolong the lifespan of the computing system 200 as a whole.

It is contemplated that the MSoC arrangement of the computing system 200 can be provided to increase the safety integrity level (e.g., ASIL rating) of the computing system 200 and the overall autonomous driving system of the vehicle. As described herein, the autonomous driving system can include any number of dual SoC arrangements, each of which can perform a set of autonomous driving tasks. In doing so, the backup SoC dynamically monitors the health of the primary SoC in accordance with a set of functional safety operations, such that when a fault, failure, or other error is detected, the backup SoC can readily power up its components and take over the set of tasks from the primary SoC. Further description of the SoCs and their computational components is provided below with respect to FIG. 3.

Example SoC

Figure 3:
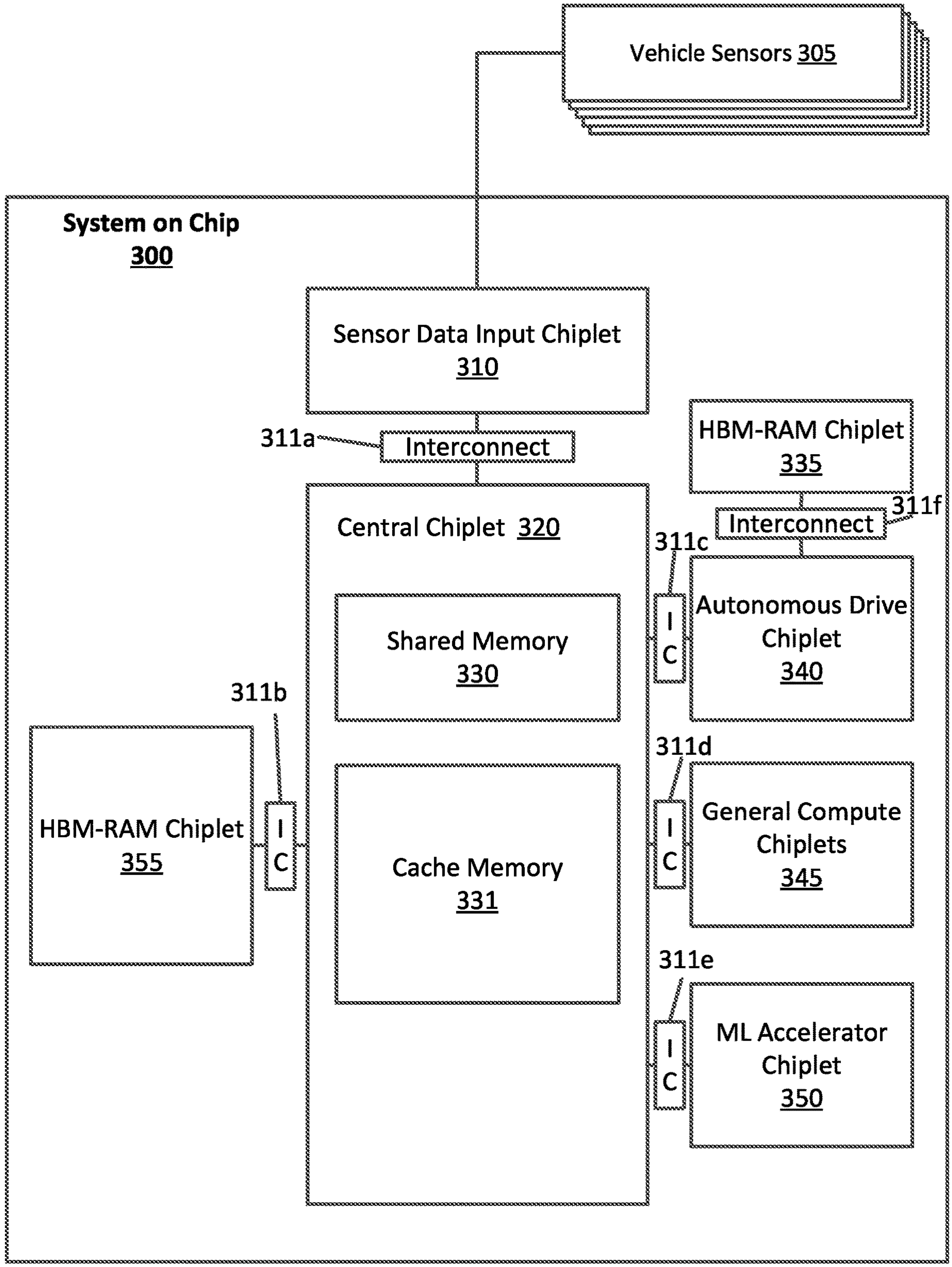
FIG. 3 is a block diagram illustrating an example system on chip, in accordance with examples described herein.

FIG. 3 is a block diagram illustrating an example system on chip 300, in accordance with examples described herein. The system on chip 300 can comprise either the first SoC 210 or the second SoC 220 as shown and described in connection with FIG. 2. Furthermore, the example system on chip 300 shown in FIG. 3 can include additional components, and the components of system on chip 300 may be arranged in various alternative configurations other than the example shown. Thus, the system on chip 300 of FIG. 3 is described herein as an example arrangement for illustrative purposes and is not intended to limit the scope of the present disclosure in any manner.

Referring to FIG. 3, a sensor data input chiplet 310 of the system on chip 300 can receive sensor data from various vehicle sensors 305 of the vehicle. These vehicle sensors 305 can include any combination of image sensors (e.g., single cameras, binocular cameras, fisheye lens cameras, etc.), LIDAR sensors, radar sensors, ultrasonic sensors, proximity sensors, and the like. The sensor data input chiplet 310 can automatically dump the received sensor data as it's received into a cache memory 331 of the central chiplet 320. The sensor data input chiplet 310 can also include an image signal processor (ISP) responsible for capturing, processing, and enhancing images taken from the various vehicle sensors 305. The ISP takes the raw image data and performs a series of complex image processing operations, such as color, contrast, and brightness correction, noise reduction, and image enhancement, to create a higher-quality image that is ready for further processing or analysis by the other chiplets of the SoC 300. The ISP may also include features such as auto-focus, image stabilization, and advanced scene recognition to further enhance the quality of the captured images. The ISP can then store the higher-quality images in the cache memory 331.

In some aspects, the sensor data input chiplet 310 publishes identifying information for each item of sensor data (e.g., images, point cloud maps, etc.) to a shared memory 330 of a central chiplet 320, which acts as a central mailbox for synchronizing workloads for the various chiplets. The identifying information can include details such as an address in the cache memory 331 where the data is stored, the type of sensor data, which sensor captured the data, and a timestamp of when the data was captured.

To communicate with the central chiplet 320, the sensor data input chiplet 310 transmits data through an interconnect 311*a*. Interconnects 311*a-f* each represent die-to-die (D2D) interfaces between the chiplets of the SoC 300. In some aspects, the interconnects include a high-bandwidth data path used for general data purposes to the cache memory 331 and a high-reliability data path to transmit functional safety and scheduler information to the shared memory 330. Network on chip (NoC) network interface units (NoC) on the chiplets can be configured to generate error-correcting code (ECC) data on both the high-bandwidth and high-reliability data paths. Each corresponding NIU on its pairing die has the same ECC configuration, which generates and checks the ECC data to ensure end to end error correction coverage. For the high-reliability data paths, the NIUs can transmit the functional safety and scheduler information in two redundant transactions, with the second transaction ordering the bits in reverse (e.g., from bit 31 to 0 on a 32-bit bus) of the order of the first transaction. Furthermore, if errors are detected in the data transfers between chiplets on the high-reliability data path, the NIUs can reduce the transmission rate to improve reliability.

Depending on bandwidth requirements, an interconnect may include more than one die-to-die interface. For example, interconnect 311*a* can include two interfaces to support higher bandwidth communications between the sensor data input chiplet 310 and the central chiplet 320.

In one aspect, the interconnects 311*a-f* implement the Universal Chiplet Interconnect Express (UCIe) standard and communicate through an indirect mode to allow each of the chiplet host processors to access remote memory as if it were local memory. This is achieved by using specialized NoC NIUs that provide hardware-level support for remote direct memory access (RDMA) operations. These NIUs also allow for freedom from interference between devices connected to the network. In UCIe indirect mode, the host processor sends requests to the NIU, which then accesses the remote memory and returns the data to the host processor. This approach allows for efficient and low-latency access to remote memory, which can be particularly useful in distributed computing and data-intensive applications. Additionally, UCIe indirect mode provides a high degree of flexibility, as it can be used with a wide range of different network topologies and protocols.

In various examples, the system on chip 300 can include additional chiplets that can store, alter, or otherwise process the sensor data cached by the sensor data input chiplet 310. The system on chip 300 can include an autonomous drive chiplet 340 that can perform operations to determine the physical characteristics of the environment around the sensors. These operations can include perception, sensor fusion, trajectory prediction, and/or other autonomous driving algorithms of an autonomous vehicle. To perform these operations, the autonomous drive chiplet 340 can include specialized hardware such as digital signal processors (DSP), a direct memory access (DMA) engine, and neural network (NN) accelerators. The autonomous drive chiplet 340 can be connected to a dedicated HBM-RAM chiplet 335 in which the autonomous drive chiplet 340 can publish all status information, variables, statistical information, and/or processed sensor data as processed by the autonomous drive chiplet 340.

In various examples, the system on chip 300 can further include a machine-learning (ML) accelerator chiplet 340 that is specialized for accelerating AI workloads, such as image inferences or other sensor inferences using machine learning, in order to achieve high performance and low power consumption for these workloads. The ML accelerator chiplet 340 can include an engine designed to efficiently process graph-based data structures, which are commonly used in AI workloads, and a highly parallel processor, allowing for efficient processing of large volumes of data. The ML accelerator chiplet 340 can also include specialized hardware accelerators for common AI operations such as matrix multiplication and convolution as well as a memory hierarchy designed to optimize memory access for AI workloads, which often have complex memory access patterns.

The general compute chiplets 345 can provide general purpose computing for the system on chip 300. For example, the general compute chiplets 345 can comprise high-powered central processing units and/or graphical processing units that can support the computing tasks of the central chiplet 320, autonomous drive chiplet 340, and/or the ML accelerator chiplet 350.

In various implementations, the shared memory 330 can store programs and instructions for performing autonomous driving tasks. The shared memory 330 of the central chiplet 320 can further include a reservation table that provides the various chiplets with the information needed (e.g., sensor data items and their locations in memory) for performing their individual tasks. Further description of the shared memory 330 in the context of the dual SoC arrangements described herein is provided below with respect to FIG. 4. The central chiplet 320 also includes the large cache memory 331, which supports invalidate and flush operations for stored data.

Cache miss and evictions from the cache memory 331 are sent by a high-bandwidth memory (HBM) RAM chiplet 355 connected to the central chiplet 320. The HBM-RAM chiplet 355 can include status information, variables, statistical information, and/or sensor data for all other chiplets. In certain examples, the information stored in the HBM-RAM chiplet 355 can be stored for a predetermined period of time (e.g., ten seconds) before deleting or otherwise flushing the data. For example, when a fault occurs on the autonomous vehicle, the information stored in the HBM-RAM chiplet 355 can include all information necessary to diagnose and resolve the fault. Cache memory 331 keeps fresh data available with low latency and less power required compared to accessing data from the HBM-RAM chiplet 355.

Figure 4:
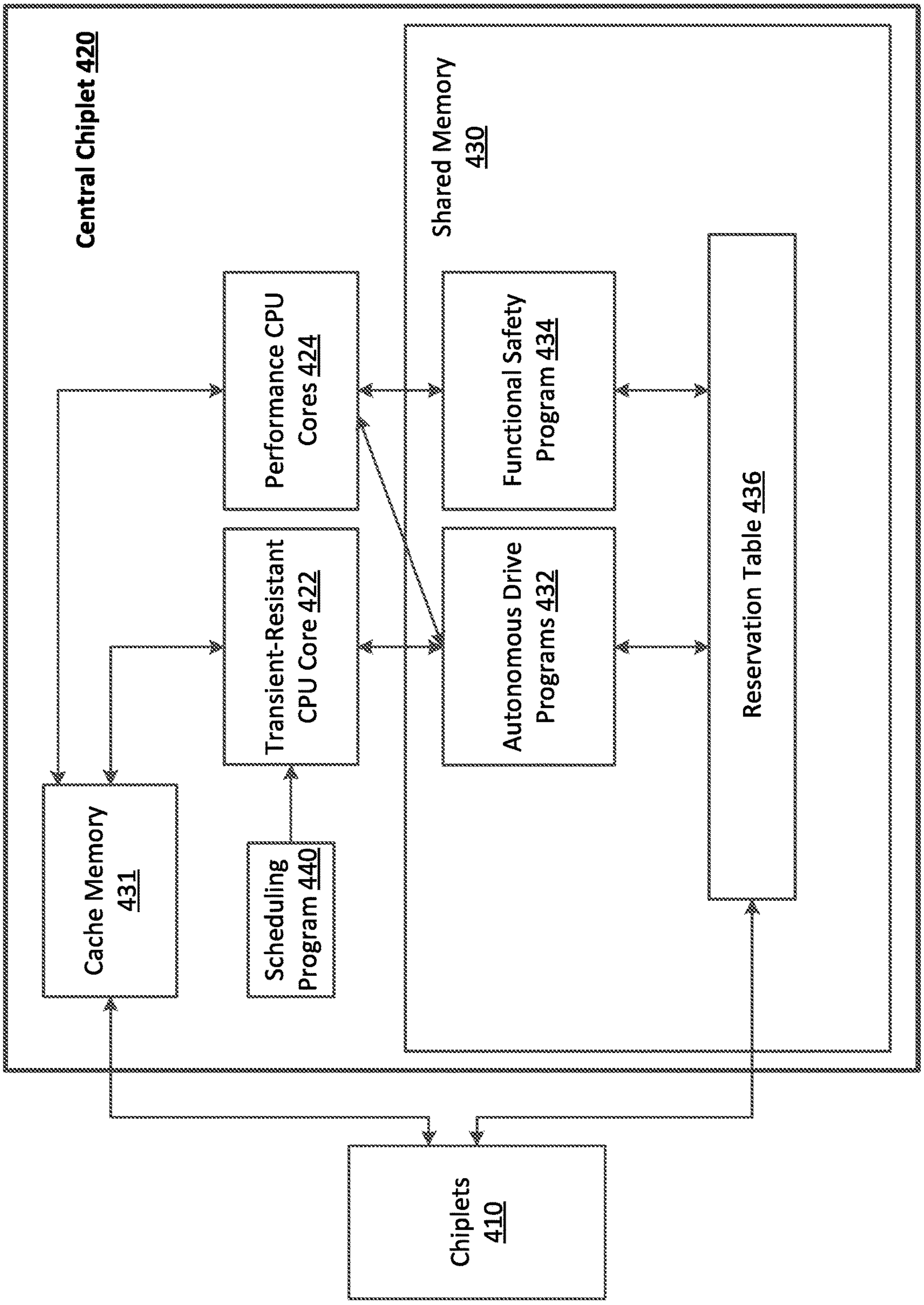
FIG. 4 is a block diagram depicting an example central chiplet of an SoC that includes a shared memory through which the chiplets of the SoC communicate.

FIG. 4 is a block diagram depicting an example central chiplet of an SoC that includes a shared memory through which the chiplets of the SoC communicate. The central chiplet 420 shown in FIG. 4 can correspond to the central chiplet 320 of the system on chip 300 as shown and described with respect to FIG. 3. Furthermore, the chiplets 410 shown with respect to FIG. 4 can correspond to one or more of the sensor data input chiplet 310, autonomous drive chiplet 340, general compute chiplets 345, or ML accelerator chiplet 350 of FIG. 3.

Referring to FIG. 4, the central chiplet 420 includes a shared memory 430 that stores state information published by a set of processors 422, 424 of the central chiplet 420 as well as the other chiplets 410 of the SoC. In various examples, the set of processors 422, 424 and the additional chiplets 410 perform a set of workloads (e.g., autonomous driving tasks) associated with one or more autonomous drive programs 432 and publish state information corresponding to those workloads in a reservation table 436. The state information can include an identifier for the workloads, dependency information for the workloads, and whether one of the chiplets 410 is working on or has completed that workload. The identifier can include details such as an address in the cache memory 431 where the data is stored, the type of data, and a timestamp of when the data was captured.

As described herein, the chiplets 310 can execute workloads in a number of workload pipelines, such that successive workloads of the pipeline are dependent on the outputs of preceding workloads in the pipeline. In various implementations, the processors 422, 424 and chiplets 410 can execute multiple independent workload pipelines in parallel, with each workload pipeline including a plurality of workloads to be executed in a deterministic manner. Each workload pipeline can provide sequential outputs (e.g., for other workload pipelines or for processing by one of the autonomous drive programs 432 for autonomously operating the vehicle). Accordingly, as the chiplets 410 push information into the reservation table 436, the shared memory 430 aggregates the beginning and end of each workload, enabling the chiplets 410 to communicate with each other through the shared memory 430 via the state information. Through concurrent execution of the workloads in deterministic pipelines, the autonomous drive programs 432 can autonomously operate the controls of the vehicle along a travel route.

In some aspects, the processors include a transient-resistant CPU core 422 to run the scheduling program 440, which schedules workloads of the autonomous drive programs 432 and functional safety program 434. The transient-resistant CPU core 422 is designed to resist and recover from transient faults caused by environmental factors such as cosmic radiation, power surges, and electromagnetic interference. These faults can cause the CPU to malfunction or produce incorrect results, potentially leading to system failures or security vulnerabilities. To address these issues, the transient-resistant CPU core 422 can include a range of hardware-based fault detection and recovery mechanisms, such as redundant execution units, error-correcting code (ECC) memory, and register duplication. These mechanisms can detect and correct errors in real-time, ensuring that the CPU continues to function correctly even in the presence of transient faults. Additionally, the transient-resistant CPU core 422 may include various software-based fault tolerance techniques, such as checkpointing and rollback, to further enhance system reliability and resilience.

In various examples, the shared memory 430 can include a FuSa program 434 that performs health monitoring and error management operations for the primary SoC as well as the backup SoC. Likewise, the backup SoC can also include a set of chiplets and a central chiplet with a shared memory in which the components of the backup SoC publish state information. The central chiplet of the backup SoC can further include FuSa components for performing health monitoring and error management tasks for the backup SoC, as well as having direct memory access to the state information of the primary SoC.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature.

What is claimed is:

1. A computing system comprising:

a plurality of chiplets executing a plurality of workloads, the plurality of chiplets including:

a central chiplet including (a) a shared memory to store state information for the plurality of workloads, and (b) a cache memory accessible by the plurality of chiplets;

a sensor input chiplet to execute one or more workloads for receiving sensor data from a plurality of sensors, and to store the sensor data in the cache memory;

a machine learning accelerator chiplet to execute multiple workloads for accessing the sensor data in the cache memory, and for calculating inferences using the sensor data and machine learning; and an autonomous drive chiplet to execute one or more workloads for calculating autonomous driving algorithms based at least in part on inferences calculated by the machine learning accelerator chiplet;

wherein each chiplet of the plurality of chiplets communicates with other chiplets of the plurality of chiplets by (i) accessing, in the shared memory, state information for each workload that is to be executed by the chiplet, and (ii) storing, in the shared memory, state information for each workload that is executed by that chiplet;

wherein the shared memory includes a reservation table that stores the state information for the plurality of workloads, the state information for each workload including an identifier for the workload, dependency information for the workload, and an indication of whether one of the plurality of chiplets is working on or has completed the workload, the identifier including an address in the cache memory where data for the workload is stored; and wherein the plurality of workloads are organized into one or more workload pipelines in which successive workloads of a respective workload pipeline are dependent on outputs of preceding workloads of the respective workload pipeline, and wherein the dependency information for each workload reflects the dependencies of the successive workloads of the respective workload pipeline.

2. The computing system of claim 1, wherein the plurality of chiplets includes one or more general compute chiplets.

3. The computing system of claim 1, wherein the plurality of chiplets includes a cache memory chiplet accessible by the plurality of chiplets.

4. The computing system of claim 1, wherein the autonomous drive chiplet is coupled to a dedicated cache memory chiplet.

5. The computing system of claim 1, wherein the plurality of chiplets interface through die-to-die interconnects, each die-to-die interconnect including one or both of (i) a high-bandwidth data path configured to carry general-purpose data to the cache memory, and (ii) a high-reliability data path configured to transmit functional safety and scheduler information to the shared memory.

6. The computing system of claim 1, wherein the shared memory stores a plurality of programs to execute a plurality of workload pipelines in parallel.

7. The computing system of claim 6, wherein the central chiplet includes a transient-resistant CPU core to schedule the plurality of programs.

8. The computing system of claim 1, wherein each of the plurality of chiplets includes at least one transient-resistant CPU core.

9. The computing system of claim 1, wherein each of the plurality of chiplets communicates through the shared memory by synchronizing workloads in a reservation table stored in the shared memory.

10. A system for a multiple chiplet architecture, the system comprising:

a plurality of chiplets executing a plurality of workloads, the plurality of chiplets including:

a central chiplet including (a) a shared memory to store state information for a plurality of workloads, and (b) a cache memory accessible by a plurality of chiplets;

a sensor input chiplet to execute one or more workloads for receiving sensor data from a plurality of sensors and store the sensor data in the cache memory;

a machine learning accelerator chiplet to execute multiple workloads for accessing the sensor data in the cache memory, and for calculating inferences using the sensor data and machine learning; and an autonomous drive chiplet to execute one or more workloads for calculating autonomous driving algorithms based at least in part on inferences calculated by the machine learning accelerator chiplet;

wherein each chiplet of the plurality of chiplets communicates with other chiplets of the plurality of chiplets by (i) accessing, in the shared memory, state information for each workload that is to be executed by the chiplet, and (ii) storing, in the shared memory, state information for each workload that is executed by that chiplet;

wherein the shared memory includes a reservation table that stores the state information for the plurality of workloads, the state information for each workload including an identifier for the workload, dependency information for the workload, and an indication of whether one of the plurality of chiplets is working on or has completed the workload, the identifier including an address in the cache memory where data for the workload is stored; and wherein the plurality of workloads are organized into one or more workload pipelines in which successive workloads of a respective workload pipeline are dependent on outputs of preceding workloads of the respective workload pipeline, and wherein the dependency information for each workload reflects the dependencies of the successive workloads of the respective workload pipeline.

11. The system of claim 10, wherein the plurality of chiplets includes one or more general compute chiplets.

12. The system of claim 10, wherein the plurality of chiplets includes a cache memory chiplet accessible by the plurality of chiplets.

13. The system of claim 10, wherein the autonomous drive chiplet is coupled to a dedicated cache memory chiplet.

14. The system of claim 10, wherein the plurality of chiplets interface through Universal Chiplet Interconnect Express interconnects.

15. The system of claim 10, wherein the shared memory stores a plurality of programs to execute a plurality of workload pipelines in parallel.

16. The system of claim 15, wherein the central chiplet includes a transient-resistant CPU core to schedule the plurality of programs.

17. The system of claim 10, wherein each of the plurality of chiplets includes at least one transient-resistant CPU core.

18. The system of claim 10, wherein each of the plurality of chiplets communicates through the shared memory by synchronizing workloads in the reservation table stored in the shared memory.

19. A system on chip comprising:

a plurality of chiplets executing a plurality of workloads, the plurality of chiplets including:

a central chiplet including (a) a shared memory to store state information for a plurality of workloads, and (b) a cache memory accessible by a plurality of chiplets;

a sensor input chiplet to execute one or more workloads for receiving sensor data from a plurality of sensors and store the sensor data in the cache memory;

a machine learning accelerator chiplet to execute multiple workloads for accessing the sensor data in the cache memory, and for calculating inferences using the sensor data and machine learning; and an autonomous drive chiplet to execute one or more workloads for calculating autonomous driving algorithms based at least in part on inferences calculated by the machine learning accelerator chiplet;

wherein each chiplet of the plurality of chiplets communicates with other chiplets of the plurality of chiplets by (i) accessing, in the shared memory, state information for each workload that is to be executed by the chiplet, and (ii) storing, in the shared memory, state information for each workload that is executed by that chiplet;

wherein the shared memory includes a reservation table that stores the state information for the plurality of workloads, the state information for each workload including an identifier for the workload, dependency information for the workload, and an indication of whether one of the plurality of chiplets is working on or has completed the workload, the identifier including an address in the cache memory where data for the workload is stored; and wherein the plurality of workloads are organized into one or more workload pipelines in which successive workloads of a respective workload pipeline are dependent on outputs of preceding workloads of the respective workload pipeline, and wherein the dependency information for each workload reflects the dependencies of the successive workloads of the respective workload pipeline.

20. The system on chip of claim 19, wherein the plurality of chiplets includes one or more general compute chiplets.

* * * * *